(12) United States Patent
Kiluk et al.

(10) Patent No.: US 11,166,796 B2
(45) Date of Patent: Nov. 9, 2021

(54) ELECTRIC TOOTHBRUSH

(71) Applicants: Sebastian Kiluk, Zakliczyn (PL);
Kacper Dubiel, Jaworzno (PL)

(72) Inventors: Sebastian Kiluk, Zakliczyn (PL);
Kacper Dubiel, Jaworzno (PL)

(*) Notice: Subject to any disclaimer, the term of this patent is extended or adjusted under 35 U.S.C. 154(b) by 67 days.

(21) Appl. No.: 16/705,525

(22) Filed: Dec. 6, 2019

(65) Prior Publication Data
US 2021/0169621 A1    Jun. 10, 2021

(51) Int. Cl.
| | |
|---|---|
| *A46B 13/02* | (2006.01) |
| *A46B 15/00* | (2006.01) |
| *A61C 17/26* | (2006.01) |
| *A61C 17/22* | (2006.01) |
| *A46B 13/00* | (2006.01) |
| *A46B 7/04* | (2006.01) |

(52) U.S. Cl.
CPC .............. *A61C 17/221* (2013.01); *A46B 7/04* (2013.01); *A46B 13/001* (2013.01); *A46B 13/026* (2013.01); *A46B 15/0006* (2013.01); *A61C 17/26* (2013.01)

(58) Field of Classification Search
CPC . A46B 13/001; A46B 13/026; A46B 15/0006; A61C 17/221; A61C 17/26
See application file for complete search history.

(56) References Cited

U.S. PATENT DOCUMENTS

| | | | |
|---|---|---|---|
| 5,794,296 A * | 8/1998 | Wong ...................... | A61C 17/26 15/22.1 |
| 2017/0095320 A1* | 4/2017 | Addington ........... | A46B 5/0095 |

* cited by examiner

*Primary Examiner* — Randall E Chin
(74) *Attorney, Agent, or Firm* — Jacob Eisenberg

(57) ABSTRACT

An electric toothbrush having a head part with a rotating working element is described in detail. The electric toothbrush is equipped with elements configured and arranged to cooperate in driving the working element and to change the direction of its rotating movement.

15 Claims, 4 Drawing Sheets

ELECTRIC TOOTHBRUSH

BACKGROUND

Electric toothbrushes having a head with a rotating working element in the form of a single cylindrical brush or in the form of a pair of brushes are becoming an increasingly common hygiene tool allowing effective removal of deposits from teeth. For proper and effective teeth cleaning, including spaces in between teeth, it is necessary to apply the movement of the toothbrush head in a direction such that the bristles move in a rotating manner from the gums towards the biting edge of the teeth. During the cleaning of the front and rear tooth surfaces and of the upper and lower jaw teeth, the rotating movement of the brush has to be reversed; thus, known toothbrushes are equipped with technical means that enable the change of the rotation direction.

The European patent EP2757995 discloses an electric toothbrush with a construction in which the rotation direction of the working element is changed automatically, the change being caused by the change of the orientation and direction of the force pressing the working element towards the teeth, such that when brushing the teeth, the working element always rotates in the direction from the gums to the biting edge of the teeth. This was achieved by a rotating arrangement of the head of the toothbrush in the handle, the head of the toothbrush comprising a rotating working element, and by the eccentric location of the rotating working element of the head of the toothbrush with respect to the rotation axis of the head with respect to the base, while coupling the electric contacts of the rotation direction switch of the motor driving the working element with the head and the handle of the toothbrush and activating the switch by relative rotation of the head and the handle.

EP2757995 discloses utilizing a three-state motor rotation direction switch, where the switch position is dependent on the sum of forces originating from resilient means, such means coupling rotating head with the handle, brush bristles, and forces originating from the properties of electromechanical elements constituting the motor switch.

It is known from the literature that the required functionality can be achieved with mechanical springs made of suitable material having a particular Young's modulus of elasticity allowing to provide reaction forces ranging between 1-20 N.

Limited space inside the handle meeting the anatomical requirements of the human hand reduces the spring choice set to a few basic types. Every resulting solution is subject to limited durability. Mechanical springs are usually manufactured from materials characterized in that their elastic deformation limit and material strength limit are close to each other. If the spring element is overloaded, e.g. in case of exercised too much constant force or shock impacts, it can get partially or fully cracked and broken. As a result, features of the spring element required for proper operation of the device may get lost irreversibly.

Furthermore, even with the use of materials with elastic deformation limit remaining significantly below material strength limit, the problem of plastic deformations occurring with each operation remains and results in changing the spring operation parameters.

In case of polymer synthetic materials used for manufacturing the spring, another phenomenon of elastoplastic deformations occurs causing temporary or permanent change in spring mechanical characteristics.

Moreover, any mechanical spring solution is vulnerable to damages due to material corrosion caused by contact with water or chemical contaminants from substances used in oral hygiene.

Above limitations are valid also for electromechanical elements controlling the electric motor operation because the principle of their operation is based on deformation of resilient technical means.

Resilient technical means contained in a control system of an electric toothbrush disclosed in EP2757995 follows the user exercised actions towards the equipoise state. Therefore, changes in mechanical characteristics of even one elastic element in the mechanical system would cause a shift of standby (neutral) position of the head to the left or right from a standby position of electric motor control system. As a consequence, proper control of the electric motor is diminished, and risk for faulty operation of the brush such as wrong rotation direction gets induced.

Furthermore, as another consequence of temporary or permanent loss of elastic elements properties (due to exposure to temperature changes, corrosion, dust or residua), the amount of force required to control the toothbrush might increase significantly leading to loss of the protective functionality and increased forces exercised on the brushing element and brushed oral areas consequently leading to pathological conditions of the gums or periodontal area.

The present disclosure proposes as a solution to above problem, that allows to eliminate the risks originating from the change of mechanical properties of resilient means, specifically the risk of undesired toothbrush operations and further induction of pathological conditions mentioned above.

Therefore, it is proposed to replace mechanical system of resilient means with a magnetic means that provide proper control of electric motor of the toothbrush, thus eliminating previously mentioned problems present in mechanical spring solution.

The elastic elements durability problem extends also to electrical components constituting the motor rotation control system. Typical switching elements utilize elastic deformation of conducting materials. As a result, durability of the control system is always limited by the number of possible working cycles of such elements.

Such goal can be achieved by the use of switching elements changing their state in presence of electric, magnetic or electromagnetic forces.

It is known from the patent literature that magnetic forces can be used for controlling the electric toothbrush motor operation.

U.S. Pat. No. 6,792,640 B2 discloses that a permanent magnet placed in elastic membrane in the handle can be used to control the state of magnetic field sensor element controlling the electric motor ON-OFF operation. However, this solution does not introduce the functionality of controlling the motor rotation direction and also does not eliminate the mechanical degradation risk induced by implementation of elastic means of electromechanical switching element constituting the magnetic field sensor.

U.S. Pat. No. 8,214,959 B2 discloses that permanent magnets are used in an electric toothbrush for vibration excitation. The magnets constitute a stator for an acoustic wave generator, while the elastic coupling between the motor housing and the toothbrush handle is provided by springs utilizing the Young's modulus of elasticity for different materials. As a result, such coupling is vulnerable to the deficiencies of mechanical springs as mentioned before.

SUMMARY

The present disclosure relates to an electric toothbrush comprising a handle and a head movable with respect to the handle and provided with a rotating working element having at least one brush, the electric toothbrush having in addition an electric motor for driving the working element in a rotary movement in a clockwise or counterclockwise direction and having a motor rotation direction switch, coupled functionally with the head and the handle, the head is joined with the handle by a rotating coupling, and the working element is mounted in the head and located out of the rotation axis of the head with respect to the handle. The head and the handle are coupled with a coupling technical means. The coupling technical means enable—after exertion of the torque to the head—the head to rotate with respect to the handle into the left or the right position, in which position the motor rotation direction switch turns on the motor in the clockwise or counterclockwise rotation direction. After release of the torque, the coupling technical means enable to maintain the head in a standby position relative to the handle, in which position the motor rotation direction switch coupled with the head and the handle turns off the motor. According to the present disclosure the coupling technical means are magnetic means.

The magnetic means can be a set of magnets, preferably permanent magnets, mounted on the head and on the handle.

The set of magnets can comprise at least three magnets: two utmost magnets mounted on the head or on the handle and middle magnet mounted on the handle or on the head respectively, wherein the magnets are arranged in such a way, that the middle magnet remains constantly within the range of influence from the field from utmost magnets.

Any of the magnets can be replaced with a stack of two or more separate magnets.

At least one of the magnets can be mounted in a stationary socket providing fixed and adjustable standby position.

At least one of the utmost magnets can be mounted in a movable socket slidable in the direction of magnetic forces from magnets, allowing for change and readjustment of standby position.

The middle magnet can be mounted in a movable socket allowing for change and readjustment of the magnet position in the direction radial to the rotation axis of the head, providing ability to adjust the forces occurring between magnets.

The motor rotation direction switch can be controlled by a switching element changing its state in the presence of electric, magnetic or electromagnetic fields.

For example, the motor rotation direction switch can be controlled by an optical system configured to determine the rotation direction of the head with respect to the handle.

The optical system can comprise a diaphragm and two optocouplers. The diaphragm can be coupled with the head or with the handle and the optocouplers can be coupled with the handle or with the head respectively, such that when the diaphragm is coupled with the head, the optocouplers are coupled with the handle and vice versa.

Simultaneous coverage of the slots in both optocouplers can correspond to the standby position, whereas in case of an opening of the slot of only one of the optocouplers, the motor rotation direction switch turns on the motor in the clockwise or counterclockwise rotation direction. Alternatively, the simultaneous opening of the slots in both optocouplers corresponds to the standby position, whereas in case of coverage of the slot of only one of the optocouplers the motor rotation direction switch turns on the motor in the clockwise or counterclockwise rotation direction.

The motor rotation direction switch can alternatively be controlled by a magnetic system configured to determine the rotation direction of the head with respect to the handle.

The magnetic system can comprise a switching magnet and of a pair of magnetic field sensors. The switching magnet can be coupled with the head or with the handle and the sensors can be coupled with the handle or with the head respectively, such that when the switching magnet is coupled with the head, the sensors are coupled with the handle and vice versa.

Simultaneous activation of both magnetic field sensors can correspond to the standby position, whereas in case of activation of only one of the magnetic field sensors the motor rotation direction switch turns on the motor in the clockwise or counterclockwise rotation direction. Alternatively, simultaneous deactivation of both magnetic field sensors corresponds to the standby position, whereas in case of activation of only one of the magnetic field sensors, the motor rotation direction switch turns on the motor in the clockwise or counterclockwise rotation direction.

It is preferable to utilize a progressive relationship between reactive forces from the magnetic spring system and angular position of toothbrush head against its standby position, where significant increase of the force is required at the final stage of the rotation movement starting the motor. In such case, the electric motor rotation can be started before the moment in which the working element executing the operators will is being pressed against the teeth with full force ranging up to 20 N. As the result, the user gets the feedback increasing in its intensity during the switching phase of the toothbrush control system, thus the switching zone of the system becomes extended in its size allowing for easier control of the device.

BRIEF DESCRIPTION OF THE DRAWINGS

The above and other aspects of the present disclosure will become more apparent by describing exemplary embodiments in detail below with reference to the accompanying drawings, in which.

DETAILED DESCRIPTION

Figure 1:
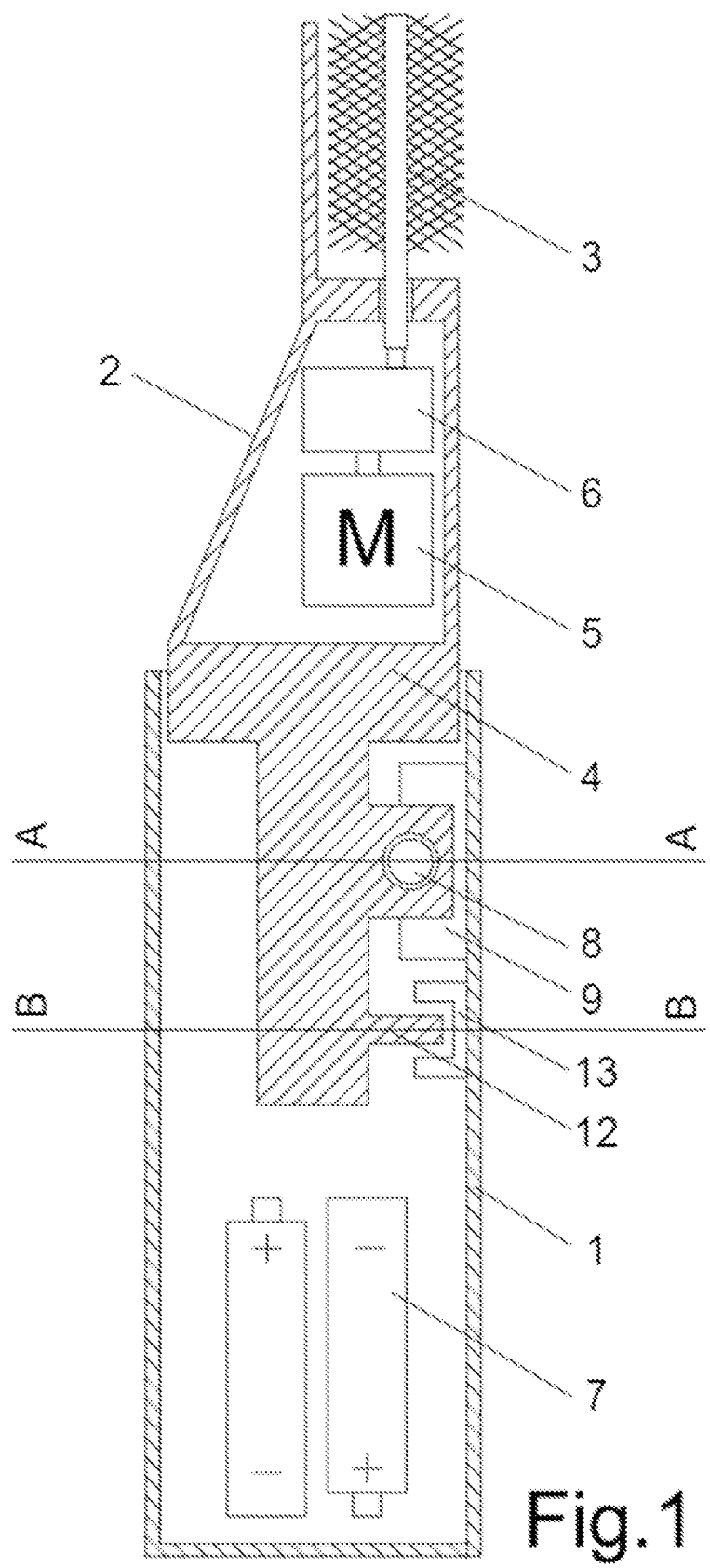
FIG. 1—shows a longitudinal section of the toothbrush,
FIG. 2—shows a cross-section A-A in FIG. 1,
FIG. 3—shows a cross-section B-B in FIG. 1,
FIG. 4—shows another cross-section B-B in FIG. 1,
FIG. 5—shows the coverage of one of the slots of optocoupler,
FIG. 6—shows the principle of the control of the rotation direction.

FIG. 1 shows a longitudinal section of the toothbrush. The toothbrush is equipped with a handle 1 having a cylindrical plastic body. However, it is understandable that in other embodiments, the handle can have the form other than cylindrical.

The toothbrush has a head part 2. The head part is partially empty inside and has a single cylindrical brush constituting the working element 3 of the toothbrush. However, in other embodiments the toothbrush can be equipped with two or more cylindrical brushes, the brushes constituting a working element. The brush 3 can rotate in two directions, i.e., to the right (clockwise) or to the left (counterclockwise).

The brush 3 is driven by an electric motor 5 with the transmission 6 fitted inside the head 2 and coupled with the brush 3. The power source 7 of the motor 5, in the form of galvanic cells or accumulators, is located in the handle 1.

The head 2 is located directly next to the handle 1 and pivotally mounted in the handle by means of a base 4, which extends inside along the handle 1.

The axis of the rotation of the brush 3 is placed eccentrically with respect to the axis of the rotation of the base 4 of the head 2 with respect to the handle 1. Owing to the eccentric arrangement of the elements, when the user presses the bristle of the brush 3 against the teeth 10, the pressure force of the teeth 10 on the brush 3 causes the rotation of the head 2 with respect to the handle 1 from the standby (equilibrium) position to the right or to the left, depending on the orientation and direction of the pressure force of the teeth 10 on the brush 3.

The head 2 and the handle 1 are coupled with a coupling technical means that enable—after exertion of the torque to the head—to rotate the head 2 with respect to the handle 1 into the left or the right position, in which position the motor rotation direction switch turns on the motor 5 in the clockwise or counterclockwise rotation direction. After release of the torque, the coupling technical means enable to maintain the head 2 in a standby position relative to the handle 1, in which position the motor 5 rotation direction switch coupled with the head 2 and the handle 1 turns off the motor 5. The coupling technical means are magnetic means.

Figure 2:
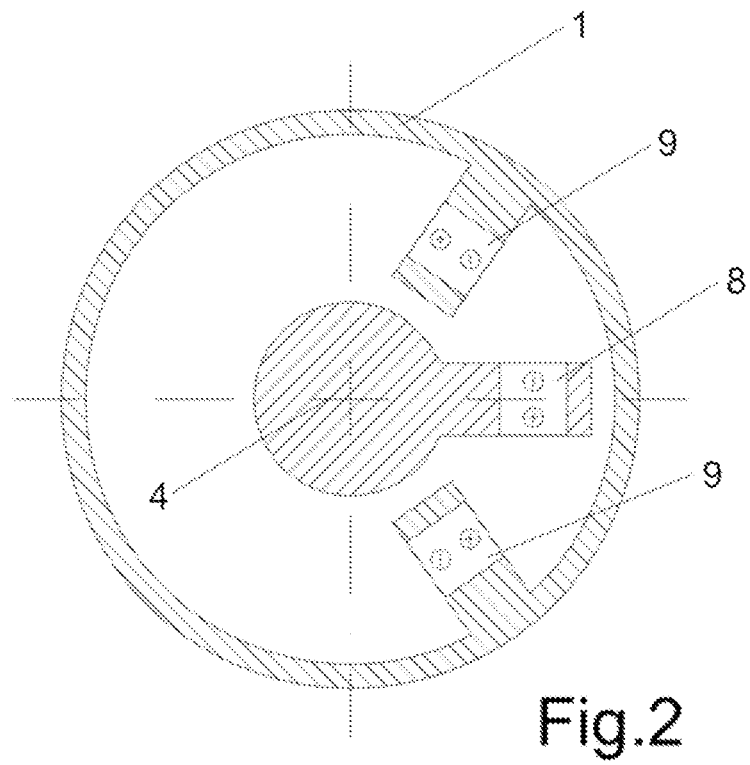

FIG. 2 shows an example of coupling magnetic means—a set of magnets comprising three magnets with poles arranged in a layout +/−−/++/− or −/++/−−/+, where two utmost magnets 9 are mounted on the handle 1 and a middle magnet 8 is mounted on the base 4 of the rotating head 2 in such a way, that it remains constantly within the range of influence from the field from utmost magnets 9.

Figure 3:
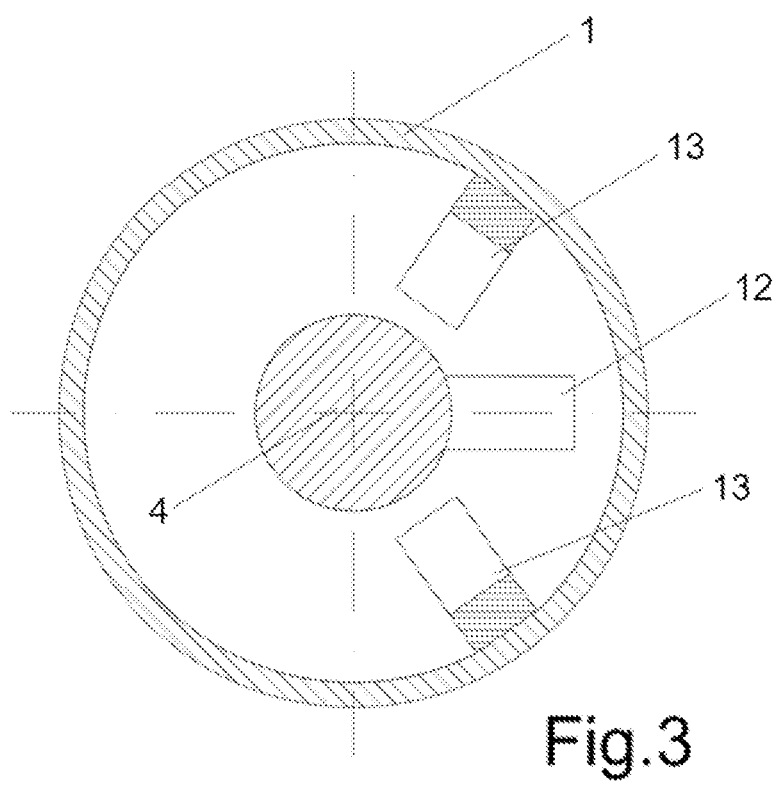
Figure 4:
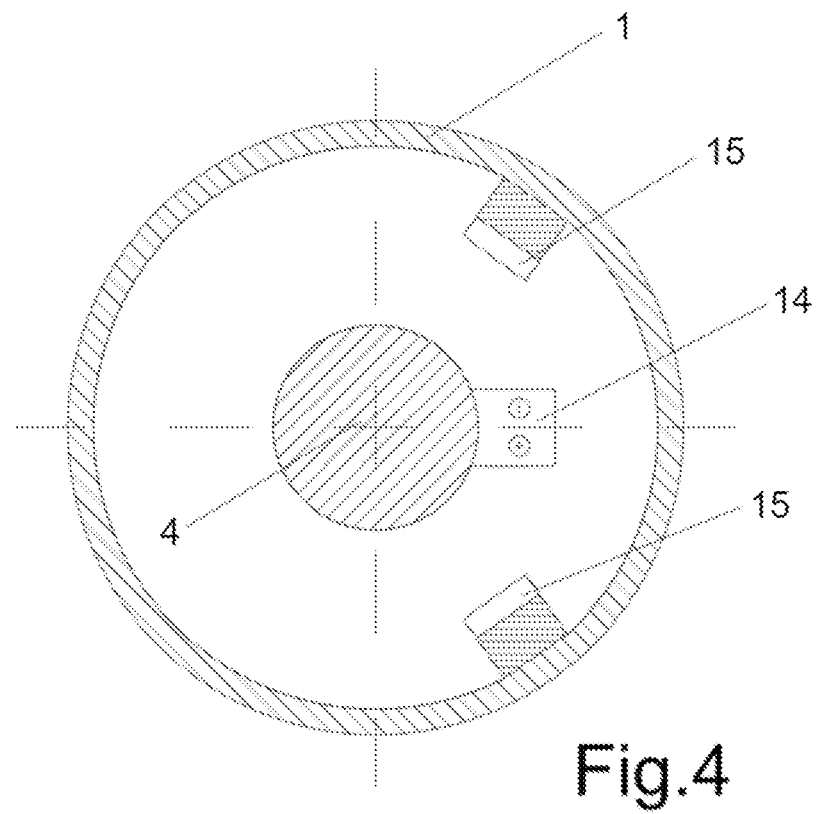

To exploit the relative rotational movement of the head 2 and the handle 1 to start and stop the motor 5 and to change the motor 5 rotation direction to the right or to the left in such a manner that the brush 3 always rotates in the direction from the gums 11 to the biting edge of the teeth 10, the toothbrush is equipped with a motor rotation direction switch that controls the toothbrush. FIGS. 3 and 4 shows the examples of such a switch.

Figure 5:
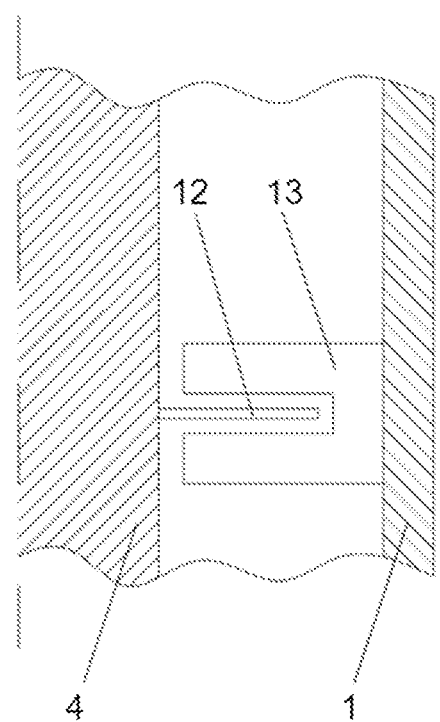

FIG. 3 shows an example of an optical system controlling the electric toothbrush, wherein the control is achieved by determining the rotation direction of the working element 3 with use of a pair of slotted optocouplers 13 controlled with a diaphragm 12 coupled mechanically with a head 2, where neutral (standby) position is distinguished by simultaneously opening the slots in both optocouplers 13. In case of coverage of one of the slots of optocoupler 13 (as shown on FIG. 5) the rotation in a clockwise or counterclockwise direction of the head 2 against the handle 1 is detected, and the electric motor gets supplied and starts rotation movement of working element 3 of the toothbrush in rotation direction corresponding to the rotation of the head 2 against the handle 1 as preferred.

FIG. 4 shows an example of a magnetic system controlling the electric toothbrush, which determines the rotation direction of the working element 3 with use of a pair of magnetic field sensors 15 controlled with a switching magnet 14 coupled mechanically with a head 2, where neutral position is distinguished by simultaneous deactivation of both magnetic field sensors 15, and in case of activation of only one of the magnetic field sensors 15 the rotation in a clockwise or counterclockwise direction of the head 2 against the handle 1 is detected, and electric motor 5 gets supplied and starts rotation movement of working element 3 of the toothbrush in a rotation direction corresponding to the rotation of the head 2 against the handle 1 as preferred.

Figure 6:
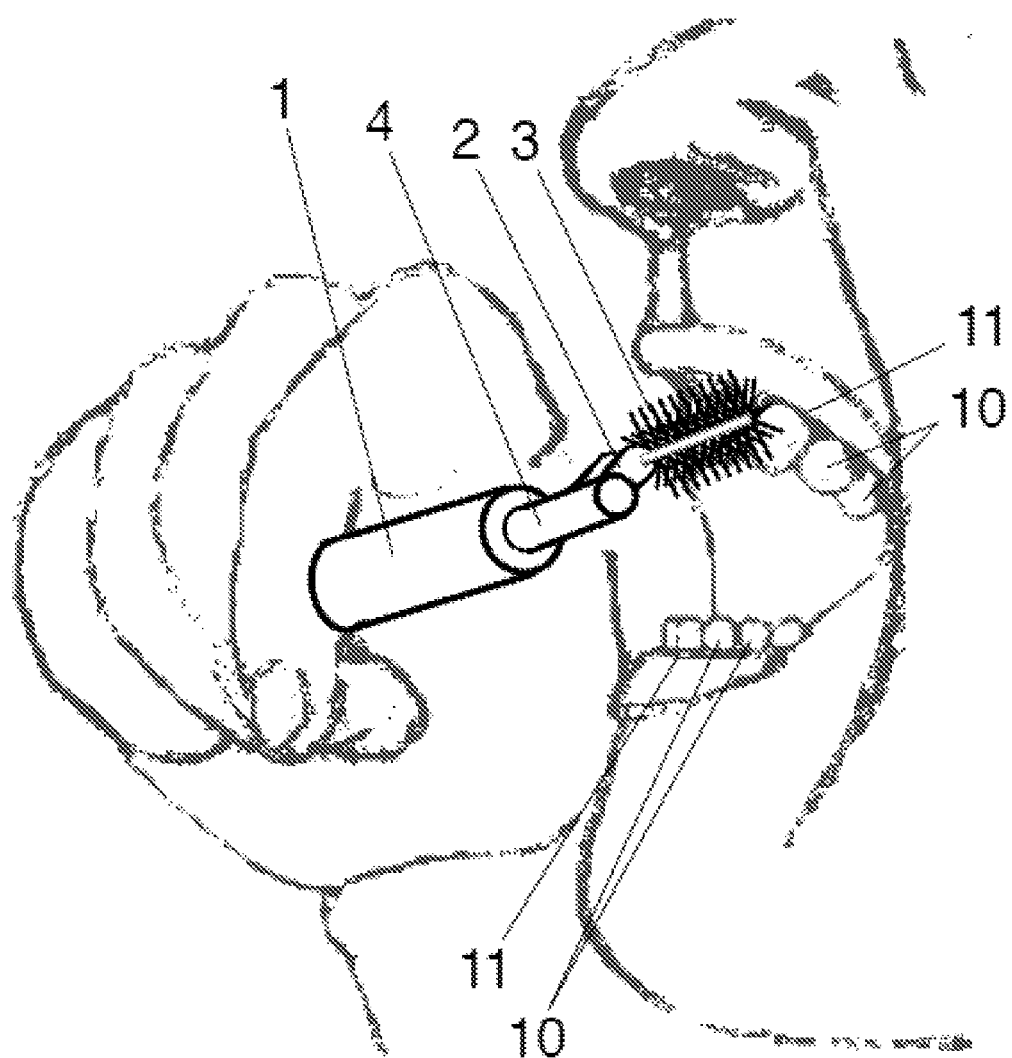

The principle of the control of the rotation direction during the operation of the toothbrush is presented in FIG. 6.

Turning on the toothbrush is best achieved by pressing the brush 3 against the teeth 10 and making the rotation of the handle 1 with a "sweeping" movement in the direction from the gum 11 to the biting edge of the teeth 10, and against the magnetic forces of the magnetic means coupling the handle 1 with the base 4 of the head 2 and keeping the handle 1 and base 4 in the standby (equilibrium) position in which the toothbrush is turned off. Releasing the pressure exerted by the brush 3 on the teeth 10 causes the rotation of the handle 1 to the equilibrium position in which the motor 5 of the toothbrush is turned off.

The movement turning on the inventive toothbrush is therefore identical to a typical "sweeping" movement made when brushing the teeth with a manual (traditional) toothbrush, because the rotation axes of the base 4 with respect to the handle 1 and the rotation axes of the brush 3 are similarly spatially oriented. This makes it essentially easier to use the device while maintaining the brushing skills acquired by the use of traditional toothbrushes.

A relative position and shape of the handle 1, the head 2 and the brush 3 makes it practically impossible to use the device when the brush 3 is placed in the mouth in such a manner that the handle 1 and the head 2 are directed towards the gums 11, and the brush 3 is directed towards the teeth 10. Consequently, it is impossible to turn on the toothbrush in such a manner that the rotating movement of the bristles of the brush 3 in the direction from the teeth 10 towards the gum 11 is produced, because then it would be necessary to push the brush 3 against the inner cheeks or against the lips or against the tongue instead of the teeth.

Turning on the toothbrush is accomplished by making a "sweeping", rotating movement with the handle 1 in the direction from the gum 11 to the teeth 10 with a simultaneous placement of the brush 3 against the brushed surface in order to overcome the magnetic forces from the magnetic means coupling the handle 1 and the base 4. Consequently, the brush 3 of the powered toothbrush is rotating in such a direction that the bristles are moving from the gum 11 towards the biting edge of the teeth 10.

The construction of the toothbrush according to the disclosure, in which in order to power the device it is necessary to rotate the base 4 of the head 2 with respect to the handle 1, makes it impossible to place the device in the mouth and turn it on in an incorrect position, because of insufficient space between the gum and inner cheeks or tongue, wherein a part of the head 2 would need to be placed, and, moreover, because of the lack of pressure force that the teeth 10 exert on the brush 3 the force being necessary to turn the handle 1 and power the motor 5 driving the brush 3.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An electric toothbrush comprising a handle and a head movable with respect to the handle and provided with a rotating working element having at least one brush, the electric toothbrush having in addition an electric motor for driving the working element in a rotary movement in a clockwise or counterclockwise direction and having a motor rotation direction switch, coupled functionally with the head and the handle, the head is joined with the handle by a coupling means, and the working element is mounted in the head and located out of the rotation axis of the head with respect to the handle, wherein:
the head and the handle are coupled with a coupling means arranged to, after exertion of a torque to the head, rotate the head with respect to the handle into a left or a right position, in which position a motor rotation direction switch turns on the motor in a clockwise or counterclockwise rotation direction;
the coupling means further arranged to enable, after release of the torque, maintenance of the head in a standby position relative to the handle, in which position the motor rotation direction switch coupled with the head and the handle turns off the motor; and
the coupling means are magnetic.

2. The electric toothbrush according to claim 1, wherein the coupling means comprises a plurality of magnets.

3. The electric toothbrush according to claim 2, wherein the plurality of magnets are permanent magnets.

4. The electric toothbrush according to claim 2, wherein the plurality of magnets are mounted on the head and on the handle.

5. The electric toothbrush according to claim 2, wherein the plurality of magnets comprise at least three magnets, the at least three magnets comprising two utmost magnets mounted on the head or on the handle and a middle magnet mounted on the handle or on the head, and wherein the at least three magnets are arranged such that the middle magnet substantially remains within a magnetic field of the two utmost magnets.

6. The electric toothbrush according to claim 5, wherein at least one of the two utmost magnets is mounted in a movable socket slidable in a direction of magnetic forces facilitating change and readjustment of a standby position.

7. The electric toothbrush according to claim 5, wherein the middle magnet is mounted in a movable socket allowing for change and readjustment of the middle magnet position in a direction radial to a rotation axis of the head, providing ability to adjust forces occurring between magnets.

8. The electric toothbrush according to claim 2, wherein at least one of the plurality of magnets is mounted in a stationary socket providing a fixed and adjustable standby position.

9. The electric toothbrush according to claim 1, wherein the motor rotation direction switch is controlled by a switching element changing its state when in a presence of an electric field, a magnetic field, or an electromagnetic field.

10. The electric toothbrush according to claim 1, wherein the motor rotation direction switch is configured to be controlled by an optical system configured to determine a rotation direction of the head with respect to the handle.

11. The electric toothbrush according to claim 10, wherein:
the optical system comprises a diaphragm and two optocouplers,
the diaphragm is coupled with the head or with the handle,
the optocouplers are coupled with the handle or with the head, and
coverage of slots in both optocouplers corresponds to a standby position, whereas in case of an opening of the slot of only one of the optocouplers, the motor rotation direction switch turns on the motor in the clockwise or counterclockwise rotation direction.

12. The electric toothbrush according to claim 10, wherein:
the optical system comprises a diaphragm and a pair of optocouplers,
the diaphragm is coupled with the head or with the handle,
the optocouplers are coupled with the handle or with the head, and
opening of slots in both optocouplers corresponds to the standby position, whereas in case of coverage of the slot of only one of the optocouplers, the motor rotation direction switch turns on the motor in a clockwise or counterclockwise rotation direction.

13. The electric toothbrush according to claim 1, wherein the motor rotation direction switch is controlled by a magnetic system and configured to determine the rotation direction of the head with respect to the handle.

14. The electric toothbrush according to claim 13, wherein:
the magnetic system comprises a switching magnet and of a pair of magnetic field sensors, the switching magnet is coupled with the head or with the handle, the sensors are coupled with the handle or with the head, and activation of both magnetic field sensors corresponds to the standby position, whereas in case of activation of only one of the magnetic field sensors, the motor rotation direction switch turns on the motor in the clockwise or counterclockwise rotation direction.

15. The electric toothbrush according to claim 13, wherein:

the magnetic system comprises a switching magnet and a pair of magnetic field sensors, the magnet is coupled with the head or with the handle, the sensors are coupled with the handle or with the head, and simultaneous deactivation of both magnetic field sensors corresponds to the standby position, whereas in case of activation of only one of the magnetic field sensors, the motor rotation direction switch turns on the motor in the clockwise or counterclockwise rotation direction.

\* \* \* \* \*